(12) United States Patent
Wilkins

(10) Patent No.: US 9,973,737 B1
(45) Date of Patent: May 15, 2018

(54) UNMANNED AERIAL VEHICLE ASSISTANT FOR MONITORING OF USER ACTIVITY

(71) Applicant: Amazon Technologies, Inc., Seattle, WA (US)

(72) Inventor: Steven James Wilkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/265,073

(22) Filed: Sep. 14, 2016

Related U.S. Application Data

(63) Continuation of application No. 14/624,504, filed on Feb. 17, 2015, now Pat. No. 9,471,059.

(51) Int. Cl.
| | |
|---|---|
| *G05D 1/00* | (2006.01) |
| *H04N 7/18* | (2006.01) |
| *H04N 5/232* | (2006.01) |
| *G06T 7/20* | (2017.01) |
| *G06F 3/16* | (2006.01) |
| *B64C 39/02* | (2006.01) |
| *B64D 47/08* | (2006.01) |
| *G05D 1/10* | (2006.01) |

(52) U.S. Cl.
CPC .......... *H04N 7/185* (2013.01); *B64C 39/024* (2013.01); *B64D 47/08* (2013.01); *G05D 1/0011* (2013.01); *G05D 1/0094* (2013.01); *G05D 1/101* (2013.01); *G06F 3/167* (2013.01); *G06T 7/20* (2013.01); *H04N 5/23222* (2013.01); *B64C 2201/127* (2013.01)

(58) Field of Classification Search
USPC .......................................................... 701/2
See application file for complete search history.

(56) References Cited

U.S. PATENT DOCUMENTS

| | | |
|---|---|---|
| 9,170,117 B1 | 10/2015 | Abuelsaad et al. |
| 2005/0195096 A1 | 9/2005 | Ward et al. |
| 2007/0200027 A1 | 8/2007 | Johnson |
| 2010/0042269 A1 | 2/2010 | Kokkeby et al. |
| 2010/0198514 A1 | 8/2010 | Miralles |
| 2010/0250022 A1 | 9/2010 | Hines et al. |
| 2011/0035149 A1 | 2/2011 | McAndrew et al. |
| 2012/0050524 A1 | 3/2012 | Rinner et al. |

(Continued)

OTHER PUBLICATIONS

Office action for U.S. Appl. No. 14/624,504, dated Mar. 11, 2016, Wilkins et al., "Unmanned Aerial Vehicle Assistant", 17 pages.

*Primary Examiner* — Tyler Paige
(74) *Attorney, Agent, or Firm* — Lee & Hayes, PLLC

(57) ABSTRACT

Techniques and systems for providing miniaturized unmanned aerial vehicles (UAVs) are disclosed. The techniques and systems can include significant off-board processing support for the UAVs to enable the UAVs to be smaller, lighter, and less expensive than conventional UAVs. The techniques and systems can include routines to provide enhanced support for police during routine traffic stops. The techniques and systems can also include routines to locate objects or people including, for example, locating a lost child in a crowd or a lost vehicle in a parking lot. The miniaturized UAVs can provide enhances perception for the user to enable the user to over and around objects for improved visibility and safety, among other things.

20 Claims, 10 Drawing Sheets

(56) References Cited

U.S. PATENT DOCUMENTS

| | | | |
|---|---|---|---|
| 2012/0133778 A1 | 5/2012 | Shih et al. | |
| 2013/0317667 A1 | 11/2013 | Kruglick | |
| 2014/0032034 A1 | 1/2014 | Raptopoulos et al. | |
| 2014/0254896 A1 | 9/2014 | Zhou et al. | |
| 2014/0336848 A1 | 11/2014 | Saund et al. | |
| 2015/0032258 A1* | 1/2015 | Passot | B25J 9/1656 |
| | | | 700/250 |
| 2015/0220249 A1* | 8/2015 | Snibbe | G06F 3/0412 |
| | | | 715/719 |
| 2015/0350614 A1* | 12/2015 | Meier | H04N 7/188 |
| | | | 348/144 |
| 2016/0039542 A1 | 2/2016 | Wang | |
| 2016/0075016 A1* | 3/2016 | Laurent | B25J 13/006 |
| | | | 700/47 |
| 2016/0117853 A1* | 4/2016 | Zhong | B64C 39/024 |
| | | | 345/634 |
| 2016/0304198 A1* | 10/2016 | Jourdan | B64C 39/024 |
| 2016/0304217 A1* | 10/2016 | Fisher | B60L 11/1809 |
| 2016/0332747 A1* | 11/2016 | Bradlow | B64D 47/08 |
| 2016/0336020 A1* | 11/2016 | Bradlow | G01S 19/49 |

\* cited by examiner

UNMANNED AERIAL VEHICLE ASSISTANT FOR MONITORING OF USER ACTIVITY

CROSS REFERENCE TO RELATED APPLICATIONS

This disclosure is a continuation of and claims priority to U.S. patent application Ser. No. 14/624,504, filed Feb. 17, 2015, now U.S. Pat. No. 9,471,059, issued Oct. 18, 2016, which is incorporated herein by reference.

BACKGROUND

Unmanned aerial vehicles (UAVs) comprise a variety of vehicles, from conventional fixed wing airplanes, to helicopters, to ornithopters (i.e., machines that fly like birds), and are used in a variety of roles. They can be remotely piloted by a pilot on the ground or can be autonomous or semi-autonomous vehicles that fly missions using preprogrammed coordinates, global positioning system (GPS) navigation, etc. UAVs can include remote control helicopters and airplanes for the hobbyist, for example.

UAVs may be equipped with cameras to provide imagery during flight, which may be used for navigational or other purposes, such as identify a house address, a threat, etc. UAVs can also be equipped with sensors to provide local weather and atmospheric conditions, radiation levels, and other conditions. UAVs may also include cargo bays, hooks, or other means for carrying payloads.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure relate generally to unmanned aerial vehicles (UAVs), and specifically to a system of one or more UAVs to act as an assistant for the user. In other words, the UAV can act as eyes and/or ears, among other things, for the user to extend the user's perception. The UAV may be used, for example, to record information from a perspective different than the user's perspective, scout dangerous situations, or locate/retrieve items for the user, among other possible tasks. In some examples, the UAV can be small enough to carry on the user's person (e.g., in a bag, in a pocket, on a jacket, etc.) and allow for ready deployment.

To simplify and clarify explanation, the disclosure is described herein as a system and method for controlling a UAV with simple voice commands to cause the UAV to perform one or more tasks, least partially autonomously, to assist the user. In some embodiments, the system may rely on a central control to perform some processing to enable the size and complexity of the UAV to be reduced. One skilled in the art will recognize, however, that the disclosure is not so limited. While the system is described below using a number of scenarios to provide users with additional perspective, locating abilities, and data, which would not otherwise be available, additional scenarios and situations are possible and are contemplated herein. In addition, the system is shown and described herein for use with hovering UAVs, but could also be applied to other vehicles using different form factors such as fixed-wing aircraft or ground-based vehicles to perform additional functions.

Many situations arise in which a user may wish to review the situation from afar. This may be because the user needs a different vantage point (e.g., to see over a crowd), because the situation is dangerous (e.g., a foxhole or underground tunnel during a military maneuver), or because the user simply can't find their car in a crowded parking lot. In these situations, and others, it would be convenient to have a UAV to provide video, audio, or other data remotely to a user without the necessity for a remote control or other equipment. It would be especially convenient if the UAV were small enough to be carried on a person.

Figure 1:
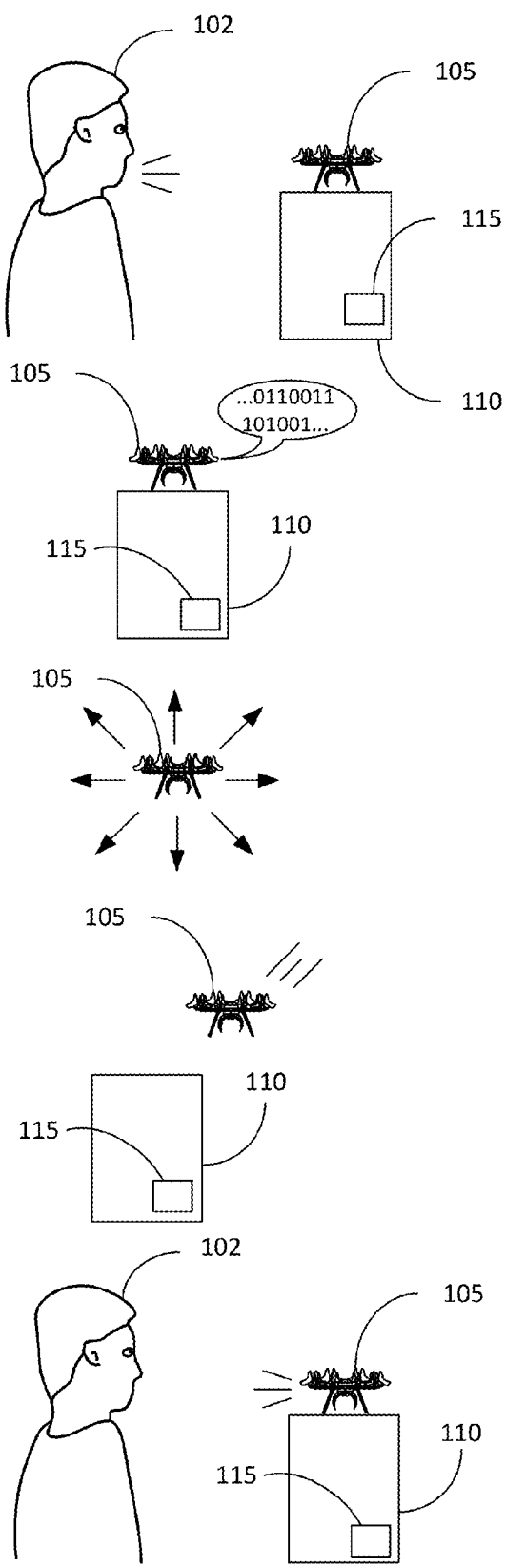
FIG. 1 is a pictorial flow diagram of an illustrative process for using a miniaturized unmanned aerial vehicle (UAV), in accordance with some examples of the present disclosure.

FIG. 1 is a pictorial flow diagram of an illustrative process 100 for providing a UAV to execute a plurality of tasks with a minimum of input from the user. As shown in FIG. 1, a user 102 may provide a command 104 to a miniaturized UAV 105. The command 104 can comprise a voice command, as shown, or can comprise a signal generated by an application ("app") on a user's cell phone, for example, or a signal from a computer, laptop, or network.

In some examples, the UAV 105 can include a docking station 110. The docking station 110 can comprise a charging system for the UAV 105, for example, and may also include a processor 115 and/or communications. The UAV 105 and the processor 115 can share processing loads. In other words, the greater the processing power of the UAV 105 the less is required of the processor 115 and vice-versa. In some examples, the UAV 105 can be very simple and light, therefore, with a majority of processing power handled by the processor. In other examples, the UAV 105 can be more specialized, with less required of the processor 115. The proportion of each task performed by the UAV 105 and the processor 115 can vary depending on the type of UAV 105, the type of processor 115, and the task to be performed, among other things.

At 120, the LAY 105 can receive a command 104 from the user 102. As mentioned above, the command 104 can comprise a voice command (as shown), for example, or a signal from an app, computer, or internet application. In some examples, the UAV 105 can comprise a microphone to receive voice commands 104 directly from the user 102.

At 130, the UAV 105, alone or in concert with the processor 115, can then interpret the command 104. If the command 104 is a voice command, for example, the UAV 105 and/or processor 115 can analyze the command 104 with voice recognition software, and then associate the command 104 with a routine or subroutine. If the command 104 is received from an app or a computer, for example, more or less interpretation may be required. In some examples, the command interpretation can be performed by the app and thus, require no additional processing by the UAV 105.

At 140, the UAV 105 can then execute the command 104. This can include running one or more routines or subroutines associated with the command 104. In some examples, the UAV 105 can have one or more preloaded routines and/or subroutines associated with commands 104. So, for example, the UAV 105 can include a "find" routine without one or more subroutines. In this manner, the UAV 105 can receive a "find my car" command 104, for example, which can include a "search" routine and a "identify car" subroutine. Similarly, the UAV 105 can receive a "find Timmy" command 104, which can include the "search" routine, and possibly an "identify Timmy" subroutine to locate a person identified as "Timmy." In some examples, Timmy can have, for example, an RFID tag sewn into his clothes or a bar code printed on his clothes, for example, to facilitate identification.

AT 150, the UAV 105 can return to the starting location or to the user's current location (e.g., the user 102 may be looking for the car at the same time). In some examples, the UAV 105 may return to its original location using global positioning system (GPS) or cellular location. In other examples, the UAV 105 can comprise additional receivers (e.g., an RFID scanner) and can return to the user's location using a homing beacon, radio frequency identification (RFID), cell phone signal, or other means. In still other examples, the UAV 105 may hover at the location of the car (or the child) and may activate an indicator such as a light, strobe, or siren to lead the user 102 to the lost item. In still other examples, the UAV 105 can provide its current location to the processor 115, and the processor 115 can provide a map to the user 102, including a route from the user's current position (e.g., the start position of the UAV 105) to the object (e.g., the current location of the UAV 105).

At 160, the UAV 105 can provide output to the user 102 based on the command. The output can be, for example, "Timmy/car located" and the relevant location or "follow me." If checking the length of a line for the user 102, for example, the output could be the length of the line. In some examples, the UAV 105 may be asked to go outside and check the weather, with the output comprises current weather condition. The UAV 105 could also be used to check the status of a number of events (e.g., "is the water boiling?" or "is the dryer still running?") for which the output can be yes or no.

Figure 2:
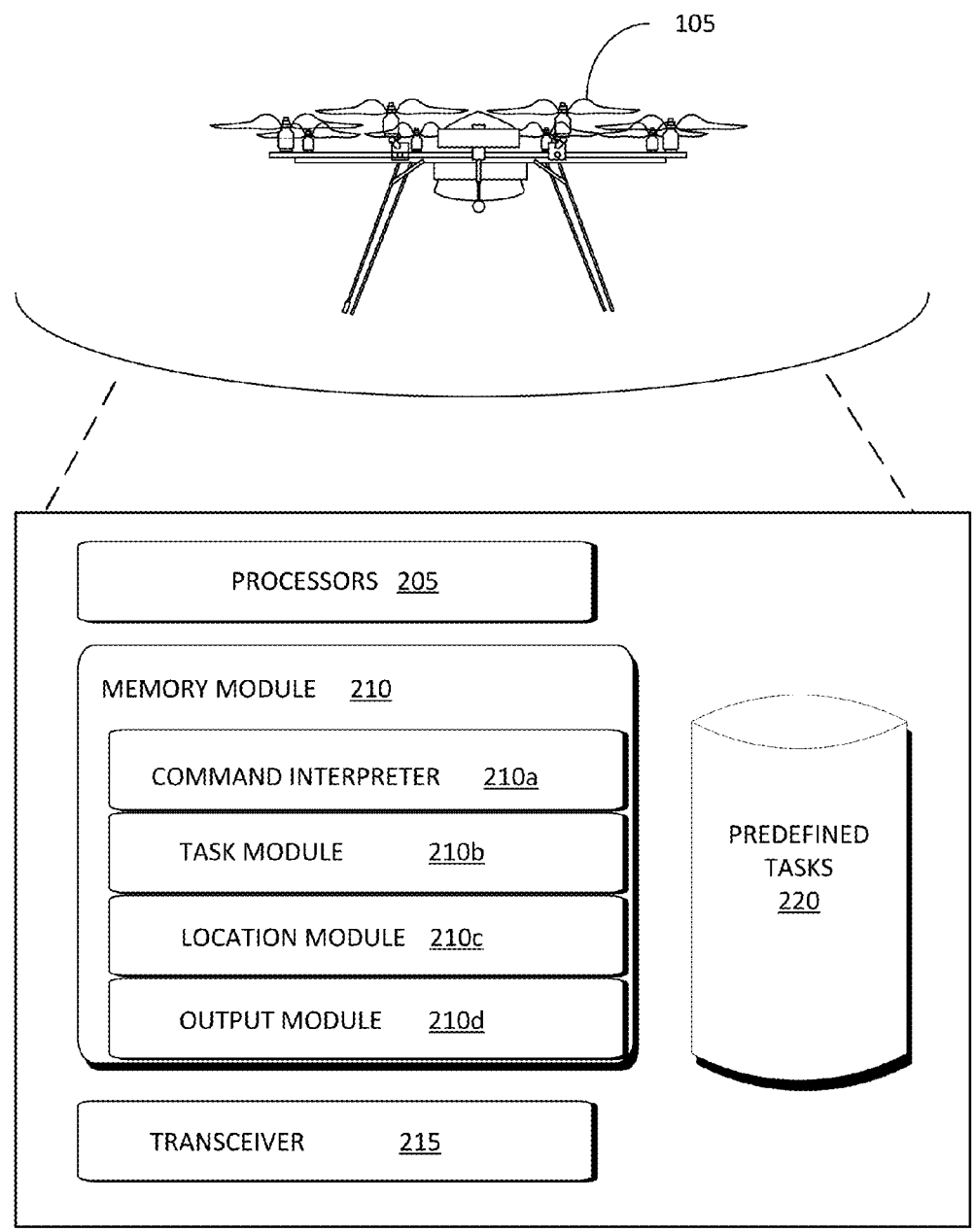
FIG. 2 is a block diagram of an illustrative computing architecture for a miniaturized UAV, in accordance with some examples of the present disclosure.

FIG. 2 is a block diagram of an illustrative computing architecture 200 for the UAV 105. FIG. 2 shows illustrative UAV 105 that may include a number of features including, but not limited to, an on-board processor, a camera, a microphone, a location device (e.g.. GPS), and a drive system. A non-exhaustive list of the UAVs 105 can include a helicopter, multi-rotor vehicle, fixed wing vehicle, or ground-based vehicle (e.g., a model car, truck, or tank).

As illustrated, the UAV 105 can include various components. In some embodiments, the components can include a one or more processors 205, a memory module 210, a transceiver 215, and one or more predefined tasks 220, or subroutines. The processors 205 can interact with the memory module 210 to execute instructions and facilitate operation of the UAV 105. The memory module 210, meanwhile, may be used to store multiple types of data, such as data files, audio and/or video media, electronic books (eBooks), or the like. In some embodiments, the memory module 210 may include, for example, a command interpreter 210a, a task module 210b, a location module 210c, and an output module 210d. The memory module 210 may also include software programs or other executable modules that may be executed by the processors 205. Examples of such programs or modules include indexing modules for indexing data, reader programs, control modules (e.g., power management), network connection software, an operating system, sensor algorithms, and so forth.

The memory module 210 may include volatile memory (such as RAM), nonvolatile memory, removable memory, and/or non-removable memory, implemented in any method or technology for storage of information, such as computer-readable instructions, data structures, program modules, or other data. Also, the processors 205 may include onboard memory in addition to or instead of the memory module 210. Some examples of storage media that may be included in the memory module 210 and/or processors 205 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the UAV 105. Any such computer-readable media may be part of the UAV 105. In some embodiments, the memory module 210 may be non-transitory computer readable media.

In accordance with one or more embodiments, the UAV 105 may also include one or more predefined tasks 220. The predefined tasks 220 may be included as part of the memory module 210, for example, or may be separate (as shown). The predefined tasks can comprise routines and subroutines associated with various commands.

The "search" task can comprise a routine for locating a lost item or person, for example, and can be associated with a number or subroutines associated with the lost item. A command to "find my car" can initiate (1) the "search" routine for locating any object, which may include flying in a serpentine pattern or a grid, for example, and periodically taking pictures for analysis and (2) a "recognize the car" subroutine, which can include image analysis of the images from the search routine or optical character recognition (OCR) of the license plate for the car.

The predefined tasks 220 can also be used for a number of essentially binary tasks such as, "is the kettle boiling?" or "is the garage door closed?" In this configuration, the predefined task 220 can comprise a "location subroutine" to enable it to fly to the stove or the garage, for example, and a "status" subroutine. In some examples, the UAV 105 can comply by flying to the stove (or the garage) and send a picture to the user, obviating the need for a logic subroutine to answer the question. In some examples, the UAV 105 can include a learning routine to enable the user to provide relevant locations to the UAV 105, which can be stored in the memory module 210 for future use.

The memory module 210 can also include a command interpreter 210a. The command interpreter 210a can include, for example, voice recognition software or OCR to interpret voice and written commands, respectively. In other examples, the command interpreter 210a can include an interface between an app on the user's phone or an internet program, for example. Regardless, the command interpreter 210a can be configured to provide commands in a form that is understandable to the UAV 105.

In some examples, the memory module 210 can also comprise a task module 210b. In addition to the predefined tasks 220, which may be per-loaded tasks included with every UAV 105, for example, the task module 210b can include tasks that are created by the user or are downloaded from an "app store." The task module 210b can enable each UAV 105 to be customized for each user and updated as demands change.

The memory module 210 can also include a navigation, or location module 210c. The location module 210c can comprise, for example, a GPS receiver, a cellular location services module, inertial guidance, or other suitable means. The location module 210c can provide location information to the UAV regarding its current location, the location of the user, and the location of various items regularly used by the user (e.g., the stove). The location module 210c can enable the user to provide output to the user regarding the locations of lost items, for example, and to find items, rooms, or other locations associated with the various commands, tasks, routines, and/or subroutines.

The memory module 210 can also include an output module 210d. The output module 210d can enable the UAV 105 to provide feedback to the user regarding the status of a task (e.g., complete, incomplete, unable to complete, etc.), the location of a lost item, or the answer to a question, among other things. The output module 210d can include a speaker, for example, for audible output, a graphical user interface (GUI), or other means to enable the UAV 105 to communicate with the user. In some examples, the output module 210s can send a message to a cell phone app or computer for display to the user.

In some examples, the UAV 105 can also include a transceiver 215. The transceiver 215 can comprise, for example, a radio, cellular, microwave, optical, or other type of transceiver or modem. The transceiver 215 can enable the UAV 105 to communicate with the user, the docking station 110, or an app on the user's phone, among other things. In some examples, the transceiver 215 can also provide interact or cellular access to the UAV 105 to provide communications, information, and location services, among other things. The transceiver 215 can also enable the UAV 105 to communicate with the user 102, the docking station 110, and/or the processor 115 regarding tasks, locations, battery or fuel reserves, and other data related to the UAV 105.

The memory module 210 may also store component drivers, such as a display driver or speaker driver, that include instructions that, when executed by the processors 205, are used to control the various components 210, 215, 220, such as the output module 210d. For example, the component drivers may be programs that can be used to control the operation, power consumption, and various operational states of each of the components 205, 210, 215. Typically, each component has its own corresponding component driver.

Figure 3:
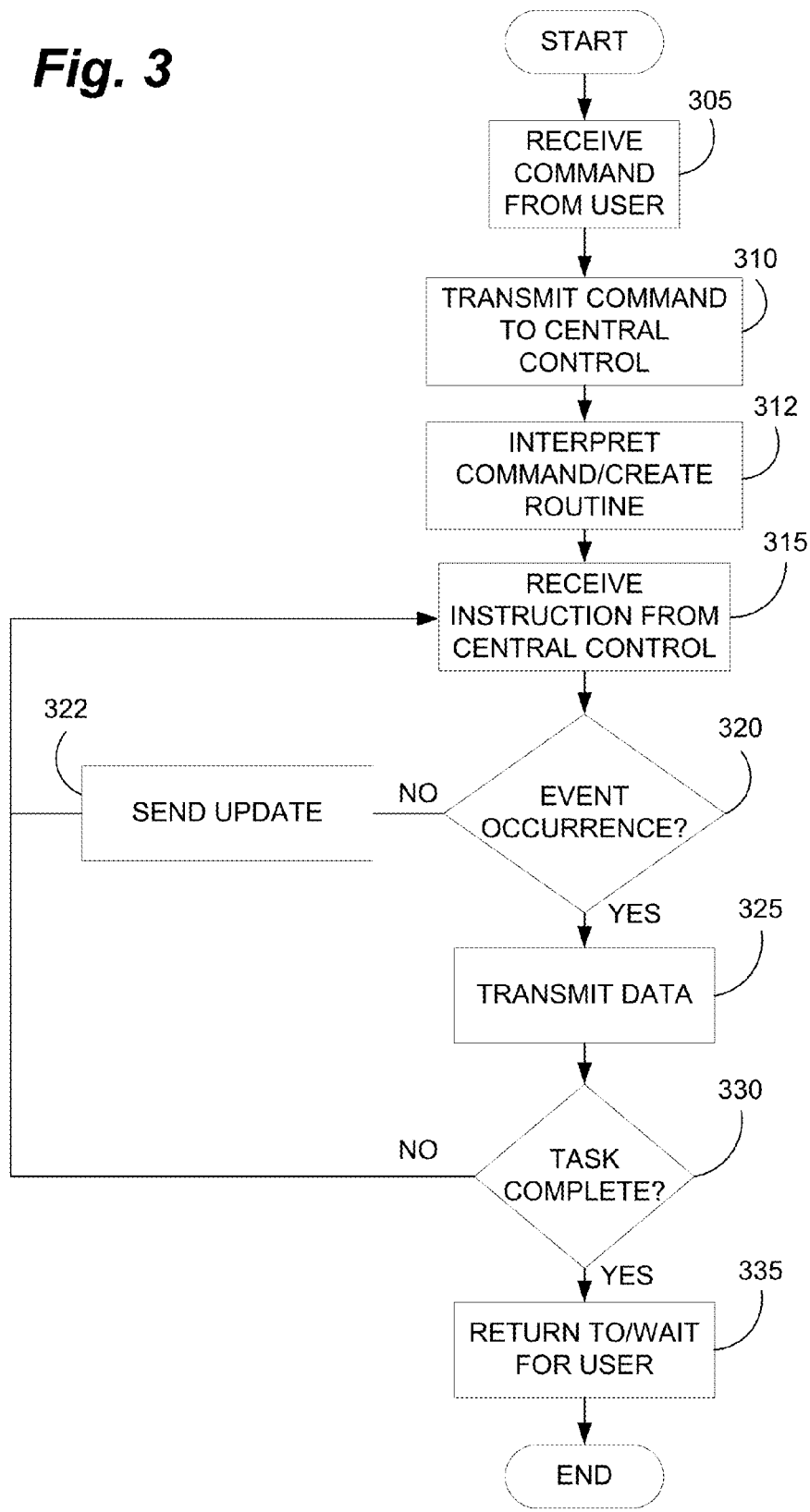
FIG. 3 is a flow diagram of a process for controlling a miniaturized UAV, in accordance with some examples of the present disclosure.

FIG. 3 shows examples of the present disclosure that can comprise a method 300 for utilizing one or more miniaturized UAVs to perform a number of tasks. In some examples, the method 300 can employ a high degree of "off-board," or centralized, processing to enable the UAV to be as small as possible. This can enable the UAV to be small, light, and inexpensive and can also minimize power requirements. In other embodiments, the UAV can be more complex, or include additional equipment, to provide additional functionality.

At 305, in some examples, the UAV can receive a command from the user. In some examples, the command can be a voice command from the user and can be received by a microphone located on the UAV. The commands can include a number of preprogrammed commands such as, for example, "find my car," "hover," and "find Timmy." These commands can be preprogrammed at the factory, for example, or can be customizable via an app, interact application, or other means. In other examples, the command can come from the user's phone as the result of, for example, a command, button, or icon from an app on the user's phone. At 310, the UAV can then send the command to a central control.

At 312, the central control can receive the command from the UAV, interpret the command if necessary (e.g., a voice command), and then create a routine or subroutine for execution by the UAV based on the command. The amount of processing required can depend on the complexity of the task, the type of command, and the type of UAV, among other things. The processing at the central control can include, for example, deciphering a voice command with voice recognition software, interpreting a command from an app, analyzing imagery and/or other data, and retrieving a routine or subroutine related to that command. After deciphering the command, the central control can analyze what is required to execute the command. This can include, for example, creating a set of instructions for the UAV (e.g., a routine) and, in some cases, breaking the routine into several subroutines.

At 315, the central control can then provide a single (or a few) instructions to the UAV (e.g., a sub-routine) such as, for example, "fly 10 feet north" and "send image." By breaking down the command into a series of smaller, or even discrete, instructions, the memory and processing requirements for the UAV and the bandwidth required to transmit each instruction can he reduced. The sub-routines can include, for example, flying the first leg of a search pattern, sending an image or positioning information from the UAV to the central control, taking-off, landing, and hovering.

At 320, the routine can also comprise one or more "events" or milestones. In the case of the "locate car" command, for example, the event can be locating the car in the images sent by the UAV. In other cases, an event may be locating a child, a bomb, clearing a room, etc. If the event has not occurred (e.g., the UAV needs to continue to search for the car), the central control can send the next instruction to the UAV such as, for example, "fly ten more feet" and then "send image." At 322, in some examples, the UAV can send a signal to the central control that it has completed the previously received instruction(s) to prompt the central control for new instructions.

At 325, if, on the other hand, the event has occurred (e.g., the central control or UAV has identified the vehicle), the UAV can transmit data to the central control such as, for example, its GPS location or an image. In other embodiments, the central control can transmit data to the UAV (e.g., providing the location of the car to the UAV from image analysis). In still other embodiments, the central control can transmit data to the user via an app on the user's phone, for example.

At 330, the system can determine if the task is complete (e.g., the car is located) or if additional tasks needs to be performed. If additional tasks need to be performed the central control can send additional instructions to the UAV. At 335, if the task is complete, the UAV can wait for the user (e.g., hover above a car or a lost child), land and wait for the user, or return to the user.

In some examples, the UAV may also receive multiple tasks and perform the tasks serially based on the priority of the task. In some examples, the priority can be set by the central control, for example, and can be included in the command. In other examples, the task priority can be determined by the UAV based on, for example, the time required completing the task, the location of the task, or the power required to complete the task.

Lost Object Recovery

People lose things all the time. It is common for a people to lose their car in a large, crowded parking lot. Children can become separated from their parents in shopping malls or at crowded amusement parks. Numerous technologies exist just to enable people to find their keys.

Figure 4A:
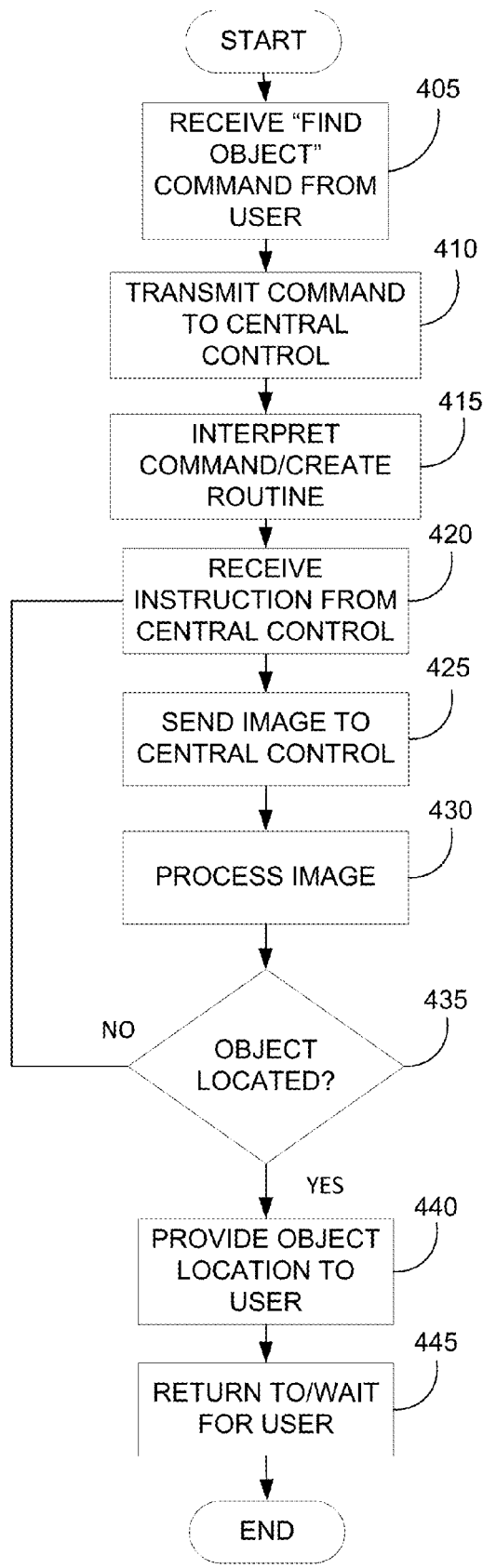
FIG. 4A is a flow diagram of a process for locating a vehicle in a parking lot a UAV, in accordance with some examples of the present disclosure.

As a result, it would be useful to be able to quickly scan a parking lot for a car or a store for a lost child, for example, using a combination of speed and altitude to improve and expedite the process. As shown in FIG. 4A, therefore, embodiments of the present disclosure can comprise a method 400 for locating an object with a UAV. At 405, the user can provide a "find (object)" command, where the object can be anything the UAV can locate and identify. If a user has lost their car in a parking lot, therefore, the user can command the UAV to "find car." The command can be in the form of a voice command, for example, a button on a key fob (similar to the emergency button), or an app on the user's phone. At 410, the command can then he sent from the UAV to the central command for interpretation.

As mentioned above, to reduce processing requirements for the UAV, a majority of processing can be done on the central control. At 415, the central control can interpret the command from the UAV and generate a routine for the UAV to follow. If the command is a voice command, for example, voice recognition software at the central control can interpret the command from the user, generate a routine to find the car, and then send one (or a few) instructions to the UAV to begin its mission. If, on the other hand, the command is a message from an app on the user's phone, little or no interpretation may be necessary, and the central control can simply create the routing for the UAV to follow.

At 420. to locate the object, the UAV may be instructed to first hover above the user's current position to provide an elevated view of the area. In some examples, the UAV may also be prompted to send an image of the elevated view to the central control for analysis. At 425, the UAV can send one or more images of the area, in this case the area proximate the user, to the central control for analysis.

At 430, the central control can process the image in an attempt to identify the user's lost object. In some examples, the central control can use image recognition software, for example, to identify the make, model, color, or other distinguishing characteristics of the user's vehicle, for example, or facial recognition software to identify a lost child. In some examples, the user's item can include a sticker, bar code, quick response code (QR® code), or other means to facilitate identification. In other examples, the central control can use OCR, for example, to identify labeling, or other writing on the object such as, for example, a license plate on the user's vehicle. At 435, after processing the image, the central control can determine if the lost object is shown in the image(s) provided by the UAV.

At 440, if the object is located, the UAV can send the object's approximate location to the central control and/or the user, provide a GPS location, or provide the image with the object highlighted, for example, to assist the user in locating the vehicle. This may be useful, for example, when the object is a lost vehicle, and a small vehicle is simply obscured by a larger vehicle (e.g., a pickup truck) in the parking lot. In other examples, the UAV may hover above the object to guide the user to it. At 445, with the object identified, the UAV can, for example, land and wait for the user, hover above the object, or simply return to the user's current location.

At 420, if, on the other hand, the object is not located in the initial image, the UAV can receive additional instructions from the central control. To this end, a portion of the routine created by the central control can comprise a search pattern for the store, parking lot, or other applicable area. The UAV can be instructed to fly down the nearest row of cars, for example, or rows in a grocery store, in segments and to send images to the central control at a predetermined interval (e.g., 1 second, 5 seconds, 30 seconds, etc.) or predetermined distance (e.g., every 10 feet), or to provide a continuous video feed to the central control. The central control can then identify the lost object (e.g., the make and model of car, the license plate number, or other identifying characteristics), as discussed above. The UAV can continue the process of (1) flying a segment and (2) sending an image until the central control indicates that the object has been located. In some examples, if the object cannot be located (e.g., it is obscured from view), the UAV can simply return to the user.

Lost Vehicle

Figure 4B:
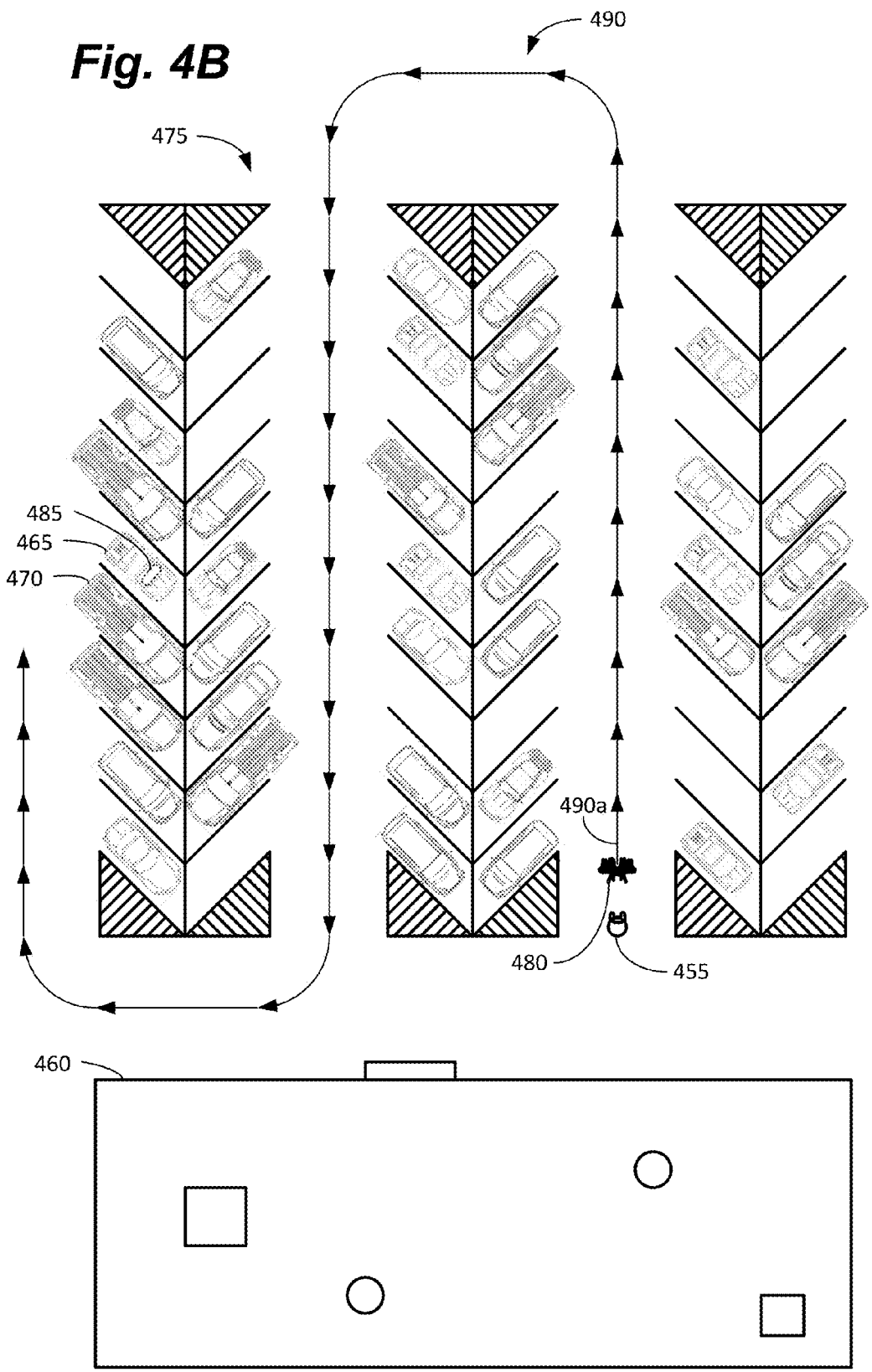
FIG. 4B is graphical, top view of the process of FIG. 2A, in accordance with some examples of the present disclosure.
Figure 5:
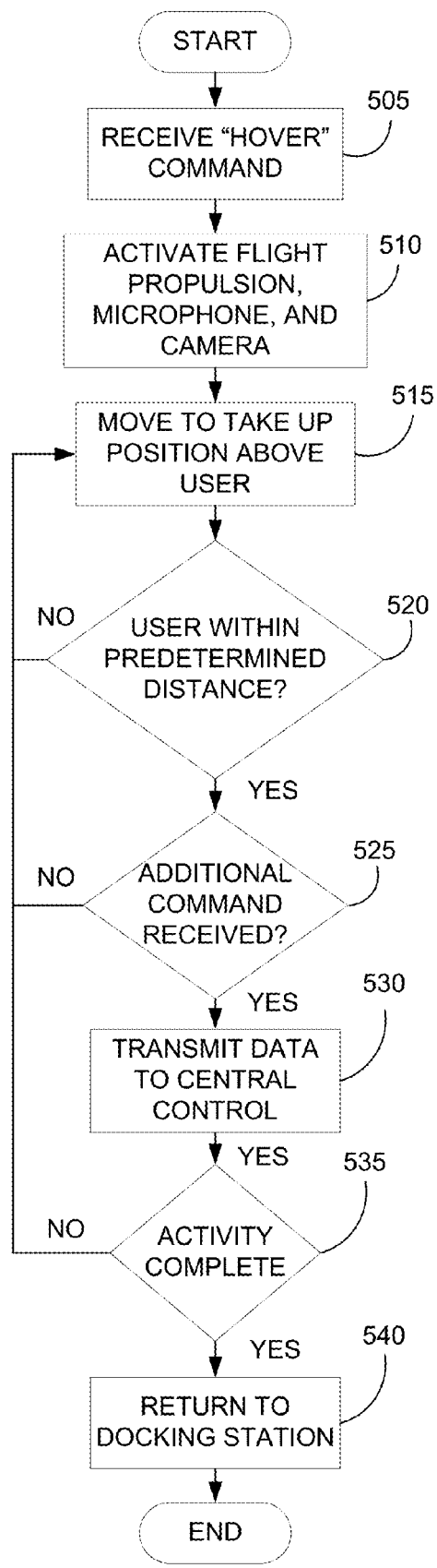
FIG. 5 is a flow diagram of a process for providing support with a UAV during a routine traffic stop, in accordance with some examples of the present disclosure.

A specific example of the method 400 is shown graphically in FIG. 4B for locating a lost vehicle in a parking lot. As the user 455 exits a shopping mall 460, for example, they may he unable to locate their vehicle 465 because, for example, the parking lot 475 is very crowded, it is parked behind a larger vehicle 470, or otherwise obscured from view. As mentioned above, in this case, the UAV 480 can first hover proximate the user 455, take an aerial image of the parking lot 475, and send the image to the central control 485. The central control 485 is depicted as a module located in the user's vehicle 465; however, the central control 485 can also comprise, for example, an app on the user's cell phone or a remote computer in communication with the UAV 480 and/or the user's cell phone, for example.

The central control 485 can then analyze the image to determine if the vehicle 465 is shown in the image. If the vehicle 465 is shown (i.e., an event has occurred), the central control 485 can instruct the UAV 480 to, for example, hover, relay its current location to the user 455, or return to the user 455 and lead them to the vehicle 465. In other examples, the central control 485 can simply determine the location of the vehicle 465 based on the location of the UAV 480 or location information provided by the image analysis.

If, on the other hand, the vehicle 465 is not immediately found, the central control 485 can instruct the UAV 480 to fly a first segment 490a of a search pattern 490 and then send a second image. In this case, a serpentine pattern is disclosed, but other patterns such as grids, for example, could also be used to cover each row of the parking lot. The segments 490a can be determined using a number of factors including, but not limited to, the field of view of the camera on the UAV 480, the altitude and attitude of the UAV 480, the number of cars in the parking lot 475, and visibility.

Flying the UAV 480 at a higher altitude, for example, may reduce the number of segments required, but may also reduce the accuracy of the search. As a result, the search of a very crowded parking lot 475 may require more time than a less crowded lot.

In some examples, the UAV 480 can also scan the parking lot for an RFID tag associated with the vehicle 465. In this manner, the UAV 480 can comprise an RFID scantier (as discussed below) and can fly over the parking lot 475 at a range suitable for the RFID system. When scanned, an RFID tag located on the vehicle 465 can enable the UAV 480 (or the central control) to positively identify the vehicle.

Lost Child

A similar method could also be used to find a lost child, for example. In this case, rather than flying up and down the rows of a parking lot, however, the UAV 480 can fly up and down the aisles of a grocery store, for example, or fly a search grid 490 in a predetermined area (e.g., a field or clearing). The search pattern 490 can be configured to cover a predefined area with images and can comprise, for example, a serpentine pattern, an x-y grid, or concentric circle pattern. The UAV can fly a segment 490*a* and then send an image to the central control for analysis. A processor at the central control can then use facial recognition software, for example, to attempt to identify the child. In an alternative embodiment, an identifying device (e.g., an MID sticker, tag, or fob) positioned on the child (e.g., sewn into the child's clothing, attached to a wrist, etc.) may assist the UAV 480 in identifying and locating the child.

If the child is identified in the figure (e.g., an event has occurred), the UAV 480 can transmit data to the central control including, for example, the GPS location of the UAV 480. In some examples, the UAV 480 can include speakers to inform the child to stay where they are and that help is on the way. As before, in some examples, the UAV 480 can hover above the child to provide a visible location. In other examples, the UAV 480 can return to the user and lead them to the child. If the child is not immediately identified, the UAV 480 can fly a second segment 490*a* and send an image, and so on, until the child is located or the search pattern 490 is completed.

This same basic method can be used for a variety of search and rescue missions. Larger UAVs 480 could be used, for example, to provide additional search coverage for downed airliners, sailors, and/or ships lost at sea. UAVs 480 can be also be used to search larger areas, such as national forests and other hiking locations, to locate, for example, lost hikers.

Firefighting

In some examples, the UAV 480 could also be fitted with a thermal imaging camera (e.g., an infrared camera) to spot fires. This can be useful in several situations including, but not limited to, house fires and forest fires. When fighting house fires or forest fires, a significant issue is re-ignition, or "flare ups." Flare ups are caused by local hot spots, or pockets of smoldering material, that are often difficult to see, but that eventually re-ignite the material around them. This is common in house fires, for example, because the structure of the house may be too unsafe for firefighters to enter the dwelling to check. Similarly, during forest fires, embers may he buried with downed trees and other debris, preventing their detection. These embers may not reignite until firefighter have left the area and, even worse, may cause the firefighters to be trapped between two fire lines.

To this end, the UAV 480 can be fitted with a thermal imaging camera and can be used to locate hotspots that would otherwise go undetected. In a house fire, for example, the UAV 480 can fly a standard search pattern 490 and provide imaging to firefighters outside, or to a central control for review. If a hotspot is detected, the UAV 480 can report its location, hover, and/or activate indicators to provide firefighters with the location. Similarly, in forest fires, the UAV 480 can be used to flight a search pattern 490 behind the fire line to ensure that hotspots do not exist that could re-ignite behind advancing firefighters. If a hotspot is detected, the location can be provided to firefighter to return to the location prior to re-ignition, which can prevent additional damage to the forest and loss of life. Additionally, thermal imaging may assist in locating those that may be trapped by house or forest fires in that heat signatures of trapped victims may be used to identify and locate the victims relative to a position of (much stronger) heat signatures associated with the fire itself. Firefighters could use such information when determining locations in which to focus their firefighting efforts on forest and house fires.

UAV Sentry

In some examples, the UAV can also be used as a security or recording device. In situations in which a user feels uncomfortable or in danger, such as walking down a city street at night, the UAV may act as a deterrent to potential attackers, provide piece of mind, and, worst case scenario, document the crime for police. In a more positive role, the UAV can also be used as a high-performance dash or helmet camera ("dash cam" and "helmet cam," respectively), recording stunts, or other activities, without the normal limitations of a fixed camera (e.g., limited field of view, shaking, blurring, etc.). In addition, because the UAV can be somewhat autonomous, damage can be reduced. In other words, helmet cams are often damaged in an accident; however, in this case, the user crashing does not necessarily cause the UAV to crash.

As shown in flowchart form in Fig, 5, at 505, in some examples, when faced with any of these situations, the user can give a "hover" or "record" command, for example, to the UAV. At 510, the UAV can activate its propulsion system and may also activate an on-board camera and/or microphone to provide video and/or audio. As mentioned above, this may be used to supplement or replace the dash cam in a police officer's cruiser, for example, or a helmet camera on a skier. At 515, the UAV can take-off from a docking station (e.g., a home location, possibly on the user's person) and can assume a predetermined position proximate the user. As the user walks down the street, for example, the UAV can follow along and provide a bird's eye view. During a traffic stop, for example, as the officer approaches the vehicle, the UAVs camera can capture the make, model, and color of the vehicle, the tag number, and any other identifying characteristics (e.g., broken taillights, body damage, etc.) as the UAV moves with the officer from the cruiser to the side of the subject's vehicle.

In some examples, the UAV can fly in front of the user to detect possible dangers and, for example, clear alleys or cross streets. In other embodiments, the UAV can fly at a predetermined height above the user (e.g., two or three feet) to provide an elevated view. Furthermore, the UAV may include an illumination source (e.g., a flashlight) that may be switched on or off at the officer's command to illuminate dark areas that might otherwise present an unforeseen danger to the officer. In still other examples, the UAV may assume a position requested by the user depending on the situation. In other words, in addition to a hover command, the user may also request a particular position (e.g., hover height, high right, forward eye level, right, left, front, back, etc.) to provide a view of the action, assume the correct position to capture crucial data (e.g., the face of a perpetrator, or simply to avoid a collision with the user (e.g., during a stunt).

At 520, the UAV can continuously monitor its position relative to the user to ensure it is in the correct position. As mentioned above, in some examples, this can he done using the onboard camera, microphone, or proximity sensors. In other examples, the UAV can receive location information from, for example, an RFID tag, transponder, cell phone, or other equipment carried by the user.

At 525, in some examples, the user may wish to provide the UAV with additional instructions. During a traffic stop, for example, if the officer wishes to "ran the plate" on the stopped vehicle, he can simply say "check plate." Similarly, during an action sequence, the user may want to request slow motion for a portion of the action. At 530, in some cases, depending on the request, the UAV can then send data, such as the previously obtained image of the tag to the central control or directly to the officer's dispatcher, for example, for image and/or facial recognition.

Similarly, the system can also include a distress command. If a user is walking alone in the city at night and feels like they are in danger, they may wish for the UAV to call 911. Similarly, if an officer is involved in an altercation, for example, the officer can provide a distress command to the UAV such as, "officer down!" or "officer needs assistance!" and the UAV can transmit a distress call to the central control or directly to the officer's dispatcher. In some examples, the distress call can also include a GPS location, for example, a timestamp, and even video footage of the incident.

At 535, in some examples, the user can indicate to the UAV that the activity is complete. In some examples, this can be done, for example, with an additional verbal command such as, for example, "stop complete" or "return." In other examples, the UAV can simply determine, for example, that the officer has returned to his cruiser. In still other examples, the user can press a button on a key fob or on an app on their cell phone.

Regardless of form, at 540, upon receiving the activity complete command, the UAV can return to the docking station (e.g., home location, possibly on the user's person). In some examples, the return to the docking station can also prompt the UAV to transmit data to the central control or to dispatch regarding, for example, the time of the stop and the vehicle tag number, the route the user walked, or elevation change (e.g., for a skiing movie). In some examples, the docking station can include both power and communications connections to the UAV.

Police Dash Cam

In a specific example, UAVs can act as a mobile dash cam for police (and others). Many modern police cars are equipped with cameras on the dashboard and often include microphones. Depending upon conditions, the position of the police car relative to action, and other factors, however, dash cams do not always provide usable video or audio. This may be the result of a foot chase moving the action away from the police vehicle, for example, or simply because the dash cam is not pointed in the right direction.

Figure 6A:
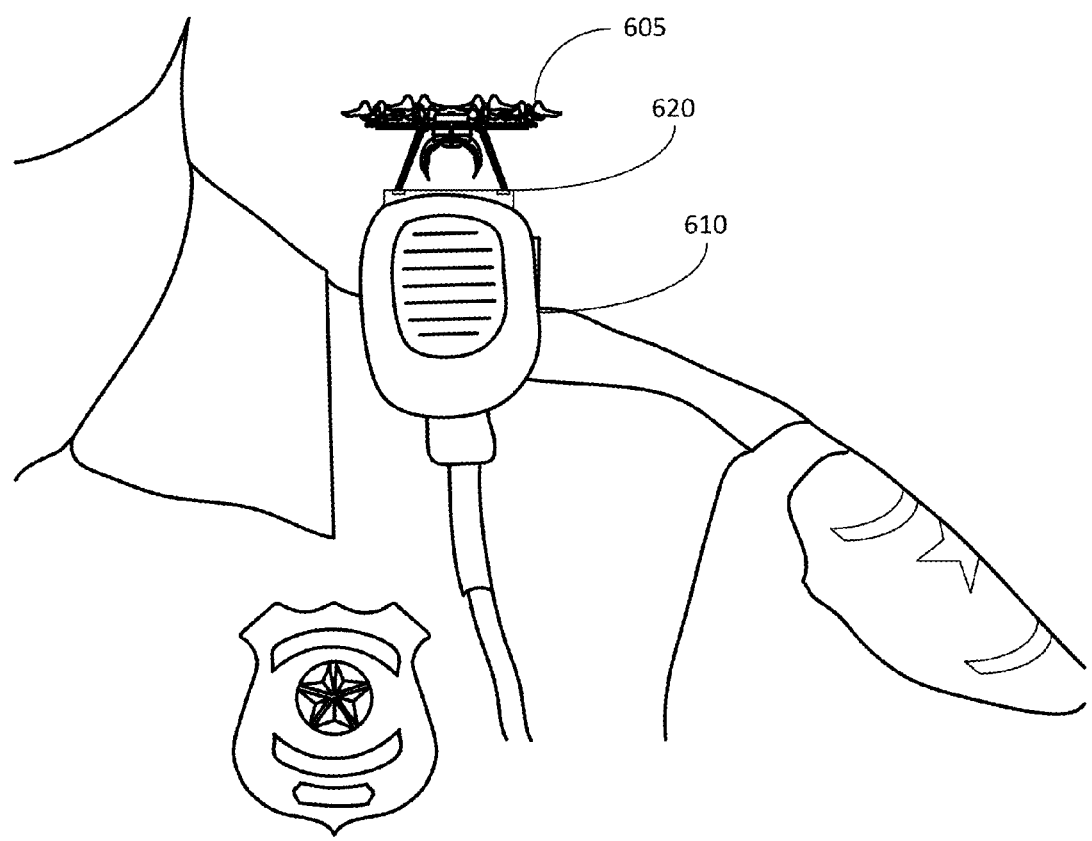
FIG. 6A is a front, perspective view of a miniaturized UAV docked on a radio microphone docking station, in accordance with some examples of the present disclosure.

To this end, a UAV can be used as a mobile dash cam to provide more focused audio and video. As shown in FIG. 6A, in some examples, the UAV 605 can dock on a docking station 620 on the officer's radio microphone 610. The docking station 620 can comprise charging pads, a retention system, and/or communications connections between the UAV 605 and the radio 610. In this manner, the UAV 605 can be charged and retained by the radio 610 and ready for deployment. In other embodiments, the UAV 605 can be foldable to fit in the officer's pocket, for example, or can be stored in a compartment on the officer's utility belt, or can simply ride on the dash or center console of the police cruiser.

Figure 6B:
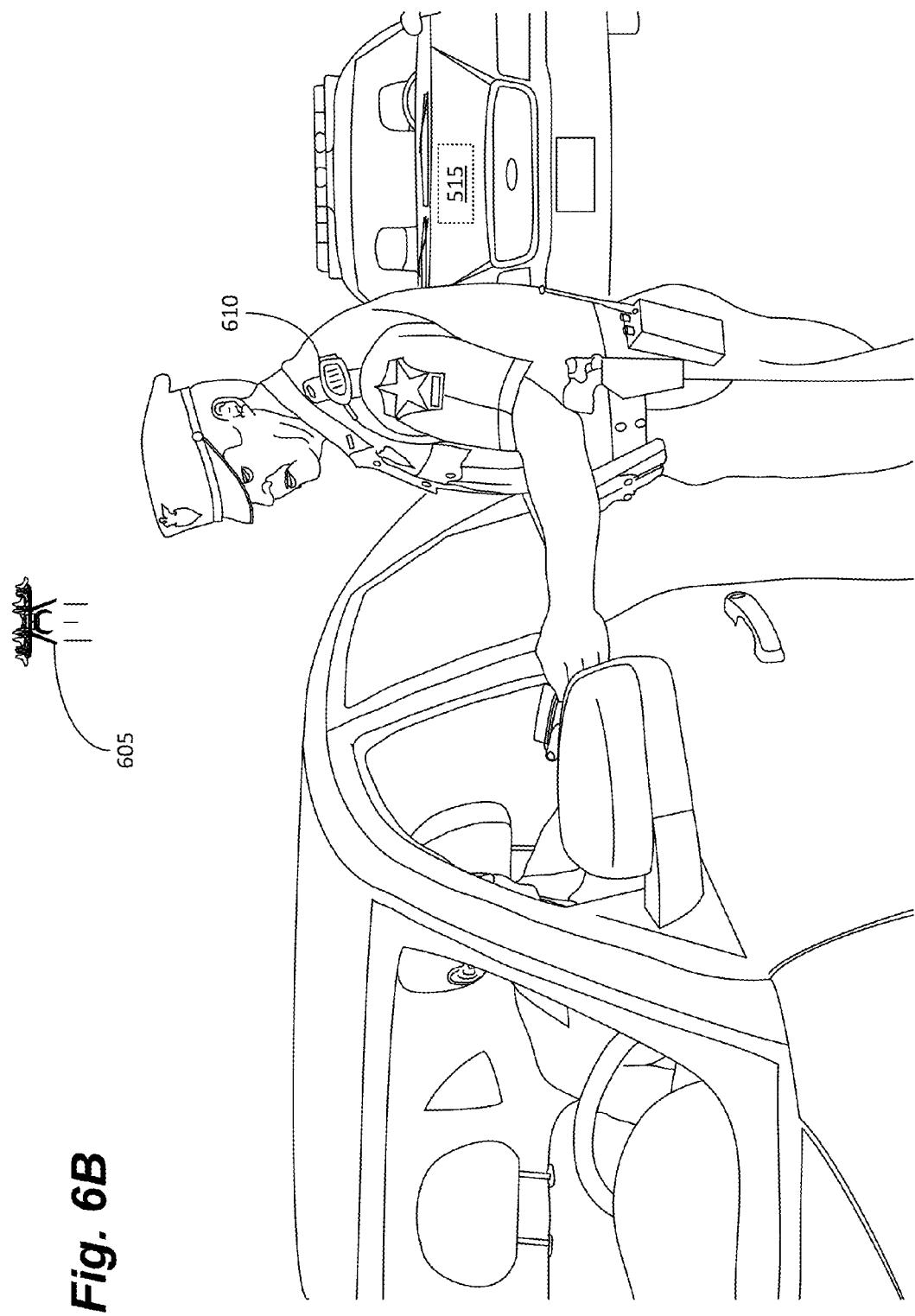
FIG. 6B is a front, perspective view of a miniaturized UAV providing support during a routine traffic stop, in accordance with some examples of the present disclosure.

As shown in FIG. 6B, during a routine traffic stop, for example, the officer can command the UAV 605 to "hover" or "follow me." The UAV can then automatically take a position proximate to the officer to record video and/or audio of the traffic stop. In some examples, the UAV can hover above the officer and face the same basic direction as the officer. In this manner, the UAV can capture the vehicle license plate as the officer approaches the vehicle, for example, and then capture video and/or audio of the driver and the interaction between the driver and the officer. If there is an altercation during the stop, for example, and the driver flees the scene, the license plate and a photo can be provided to local police agencies to quickly apprehend the suspect.

In some examples, if a foot chase develops during a traffic stop, for example, the officer can command the UAV 605 to follow the suspect so that he can attempt to cut the suspect off in the cruiser. Similarly, if there are two or more suspects, the officer can command the UAV 605 to follow one of the suspects, while he gives chase to the other. This can enable the officer to apprehend one suspect, arid then he or backup officers can apprehend the other suspect guided to his location by the UAV 605. The UAV 605 can provide periodic location updates, for example, or can simply hover above the suspect with In some examples, the UAV 605 can hover proximate the officer using an on-board program. If, for example, the officer's uniform contains an RFID chip, proximity sensor, or other electronic device, a sensor on the UAV 605 can maintain a preset distance (e.g., six feet) from the officer. In other examples, the UAV 605 can use an on-board camera and/or microphone to maintain its position.

In other examples, the central control 615 can provide instructions for the UAV 605 to maintain its position. As mentioned above, the central control 615 can comprise a module in the police cruiser (as shown) or can comprised an app running on the officer's cell phone or other equipment. The officer's cell phone, for example, can provide GPS- or cellular-based location information to the central control 615 or the UAV 605 to maintain its position.

As discussed above, any, or all, of the processing, decision making, locating, and data transmission can he performed by the central control. In other words, the UAV can act largely (or solely) as a "dumb terminal," in which it is simply carrying out instructions provided by the central control and feeding data to the central control. In this configuration, the UAV can send location information, video, audio, and other data to the central control, including commands from the user. The information and commands can then be interpreted by the central control, broken down into smaller (or discrete) steps, and sent to the UAV as instructions. As before, this can reduce the processing and power requirements on the UAV, among other things.

Of course, the UAV can be used for many other purposes. In some examples, the UAV can be used by military or police to clear dangerous areas. In this case, the UAV may have predefined tasks such as, for example, "clear left," "clear right," or "clear stairwell." In this manner, the UAV can move around a corner formed by two hallways or walls, for example, and provide a video feed of the area. In this manner, military and police forces can clear buildings without putting themselves in harm's way.

The UAV can also be useful for a number of other less defined tasks by using simple voice commands and an app on the user's smart phone or tablet. If the UAV is being used to clear tunnels during a military maneuver, for example, the layout of the tunnel may be unknown and/or random. In this case, the user may wish to use a continuous video feed and to provide the UAV with one step commands such as, for example, "fly forward ten feet," "rotate left 90 degrees," and "descend five feet." in this manner, the user can guide the UAV through the tunnel, but is not required to have additional bulky equipment such as remote controls and video screens.

A user waiting in line for a concert or sitting in traffic can gain valuable perspective. In other words, if a user is waiting in a long line to buy concert tickets, for example, the user may not he able to see over the crowd to see how many total people are in line. In this case, the user can simply say "hover" to the UAV and the UAV can take up a position at a predetermined distance above the user (e,g., 15 feet).

Similarly, a user sitting in traffic may not be able to see what is causing a slow-down. If, for example, the accident is nearby, it may be advantageous to just wait and stay on the highway. If, on the other hand, traffic extends as far as the UAV can see, even from a high perspective, then it may be advantageous to exit the highway and take surface streets. In this case, the hover command can enable the user to see how far traffic extends and make an informed decision.

Figure 7:
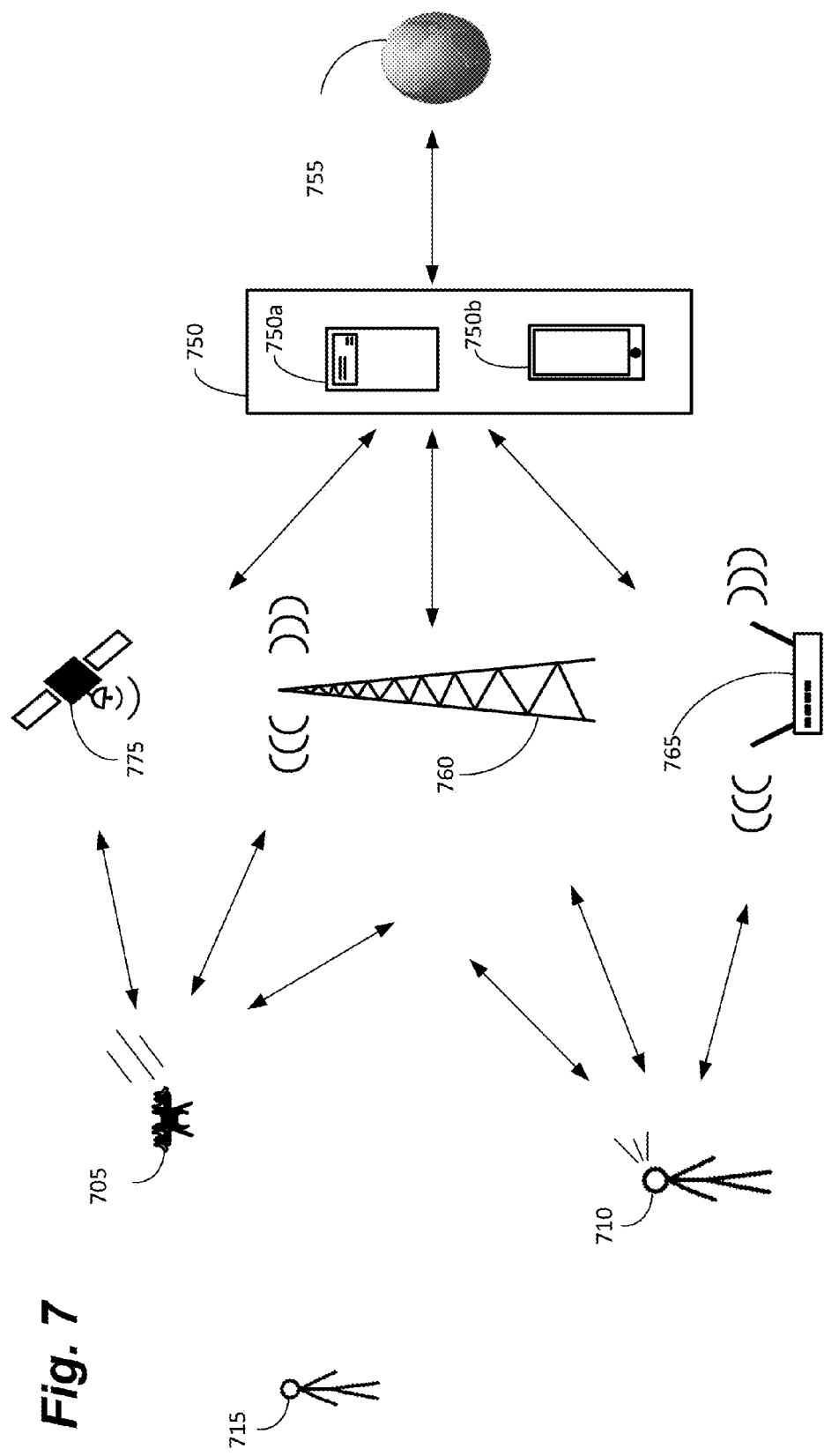
FIG. 7 is a system diagram for a system for providing and controlling a miniaturized UAV, in accordance with some examples of the present disclosure.

As shown in FIG. 7, examples of the present disclosure can also comprise systems and methods for controlling the UAV assistant for a variety of functions. As mentioned above, in some examples, the system 700 can comprise a miniaturized UAV 705 and a central control 750. In some embodiments, the central control 750 can comprise a networked computer 750*a* which can include, for example, a PC, laptop, application specific integrated circuit (ASIC), or a field programmable gate array (FPGA). In other embodiments, the central control 750 can comprise a user's cell phone 750*b* or an app on the user's cell phone. The use of a central control 750 can provide a variety of services to the UAV 705 to, among other things, reduce the size, weight, cost, and complexity of the UVA 705.

In some cases the central control 750 can be the internet 755, which may provide additional information, resources, and/or functionality for use by the UAV 705. The central control 750 can use internet mapping programs, for example, to provide location information to the user and/or the UAV 705. In other examples, the central control 750 can use internet databases or programs for image recognition, voice recognition, and other functions.

The central control 750 and the UAV 705 can be connected using one or more wireless data connections. In sonic examples, the central control 750 and the UAV 705 can be connected using satellite 775, cellular 760, and/or wireless 765 (e.g., 802.11x) connections. In some examples, the system 700 may automatically switch between available wireless networks to maintain connectivity. In other examples, the system 700 can connect to multiple networks for various functions (e.g., cellular for communications and satellite for global positioning).

As mentioned above, the central control 750 can provide processing power, decision making, and planning for the UAV 705 to enable the UAV 705 to be as small and light as possible. In some examples, the UAV 705 may be small and/or foldable to enable it to be stowed in a pocket or a purse of the user. In this manner, when needed, the UAV 705 can simply be retrieved and deployed.

In some examples, the central control 750 can comprise an app on the user's cell phone 750*b*. In this manner, the app can communicate with the UAV 705 via a cellular connection or wireless connection. In some examples, the app can include a graphical user interface (GUI), voice interface, buttons, icons, or other means to enable the user to provide input to the UAV 705. In some examples, the UAV 705 and/or central control 750 can also communicate with GPS satellites and/or cell towers 760 to provide location information via GPS or cellular location services, respectively. In still other examples, the user can communicate directly with the UAV 705 with a voice command via a microphone on the UAV 705, while the UAV 705 can communicate with the central control 750 via cellular and/or wireless connection.

As mentioned above, in some examples, the user 710 can communicate with the UAV 705 using a cell phone 750*b* or using voice commands via one or more microphones on the UAV 705. The voice commands can enable the user 710 to control certain functions on the UAV 705 without need for a cell phone 750*b*, remote control, or other equipment. In some embodiments, the subject 715 (e.g., the lost child) can also communicate with the UAV 705, the user 710, or the central control 750 via the microphones to let the user 710 know they are OK, for example. In other examples, the user 710 can communicate with the UAV 705 via a cell connection 760, wireless connection 765, or satellite connection 775.

Figure 8:
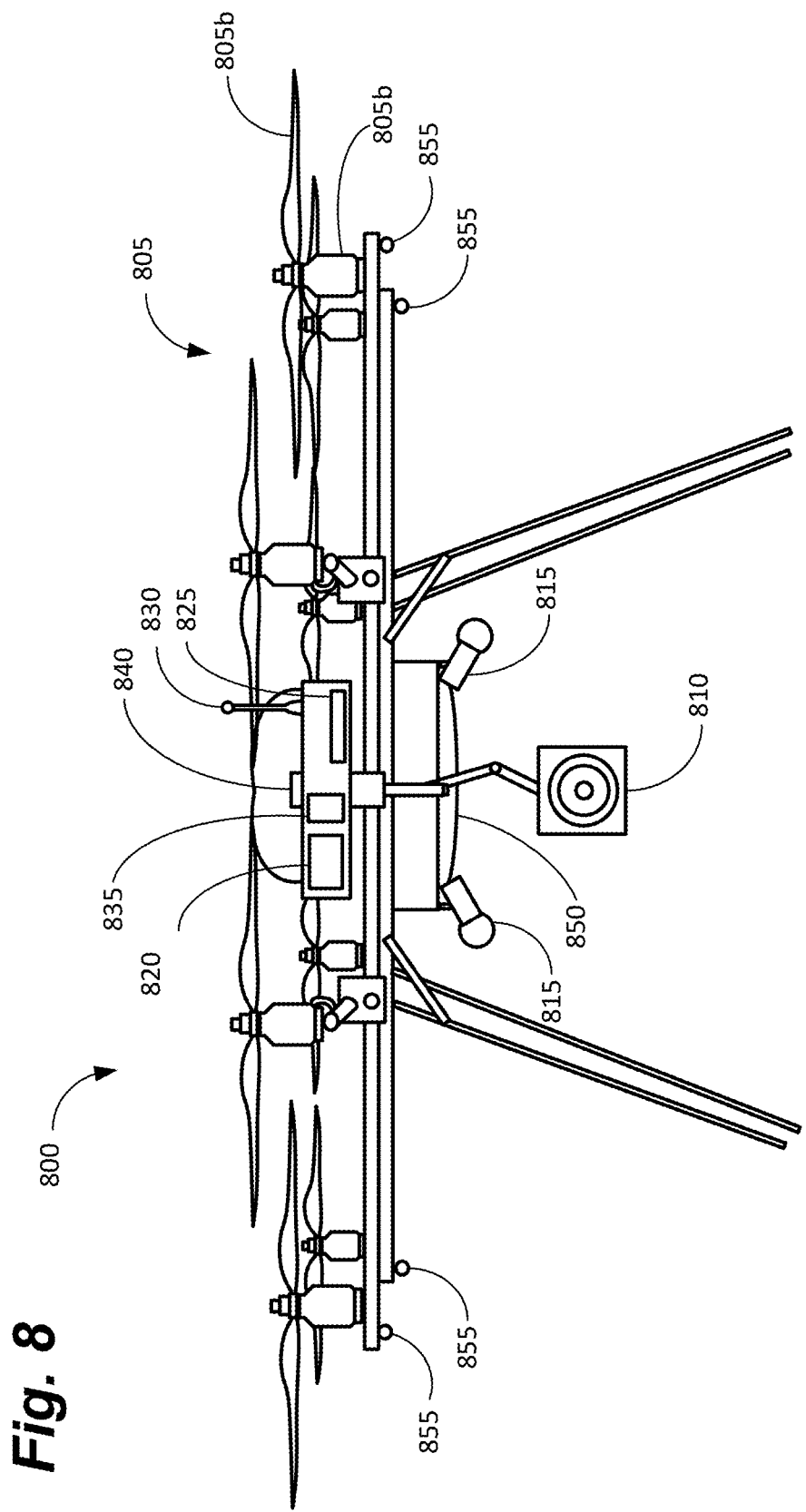
FIG. 8 is a front, perspective view of an example of a UAV, in accordance with some examples of the present disclosure.

As shown in FIG. 8, to reduce weight and complexity, each UAV 800 can he customized for a particular job. In other words, each UAV 800 can carry only the equipment required to perform a particular task. A UAV 800 used for clearing dangerous areas, for example, may be equipped with only a camera. In some examples, for added efficiency and economy, the UAV 800 can be modular to enable tools to be added and removed as necessary. The UAV 800 can comprise one or more tools to provide the user with an augmented reality, without unnecessarily increasing the size, weight, and complexity of the UAV 800.

In some examples, therefore, the UAV 800 can comprise, for example, a drive system 805, one or more cameras 810, one or more microphones 815, a processor 820, and a transceiver 825. In some examples, the UAV 800 can also comprise one or more external antennas 830. The antennas 830 can provide, for example, radio, Wi-Fi, GPS, microwave, or other communications to the transceiver 825. The transceiver 825, in turn, can enable the UAV 800 to send and receive communications between the UAV 800 and central control 750. In other examples, the transceiver 825 can also comprise a GPS receiver to enable to enhance navigation on the UAV 800 and to provide UAV 800 positioning to the central control 750.

In some examples, the drive system can comprise one or more motors 805*a* and one or more rotors 805*b* to provide a flying UAV 800. The drive system 805 is depicted herein with multiple motors 805*a* and rotors 805*b*, but could also comprise, for example, a single rotor, ducted fan, fixed wing, or other drive system. The UAV 800 can also comprise, for example, one or more drive motors 805*a* and one or more drive wheels to provide a ground based UAV. The UAV 800 can also comprise an on-board power source 835 to power the UAV 800 during flight (or travel in general). The power source 835 can comprise, for example, one or more batteries, capacitors, or fuel cells.

In some examples, the UAV 800 can also comprise one or more indicators 840. The indicators 840 can comprise, for example, strobe lights, landing lights, or lights to provide illumination for the cameras 810. The indicators 840 can also comprise homing beacons, transponders, or other means to aid in the location of the UAV 800. In some examples, the lights 840 can enable the UAV to be more easily identified (e.g., when marking the location of a person or a vehicle). In still other examples, the UAV 800 can comprise additional sensors and equipment to provide additional services. In some examples, the UAV 800 can comprise a scanner 850, which can include, for example, a laser scanner, bar code scanner, QR® code scanner, or RFID scanner.

The UAV 800 can also comprise, for example, one or more additional sensors 855, which can comprise, for example, one or more radiation sensors for work in the nuclear energy and weapons fields. In the event of a nuclear plant malfunction, for example, the UAV 800 can he programmed to fly a search pattern in the facility and document radiation levels prior to human workers entering the building. Similarly, the sensors 855 can comprise one or more chemical detectors to measure chemical levels in an around industrial accidents or when chemical weapons may have been deployed. Of course, other sensors 855 could he used and are contemplated herein.

While several possible examples are disclosed above, examples of the present disclosure are not so limited. For instance, while a system of UAVs designed to execute several tasks is disclosed, other UAV tasks could be selected without departing from the spirit of the disclosure. In addition, the location and configuration used for various features of examples of the present disclosure such as, for example, the relative location or configuration of the central control with respect to the UAV, the configuration of the UAV itself, or the level of off-board vs. on-board processing can be varied according to a particular UAV or application that requires a slight variation due to, for example, geographic size or topography, the type of UAV required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method to review user activity using an unmanned aerial vehicle (UAV), the method comprising:
    activating the UAV such that the UAV begins flying;
    activating a camera on the UAV;
    monitoring, directly by the UAV, a position of the UAV with respect to a user, wherein the position of the UAV with respect to the user is monitored directly by the UAV via at last one of processing at least one of signals received from a camera on the UAV, signals received from a microphone on the UAV, signals received from a proximity sensor on the UAV, location information received from a radio-frequency identification ("RFD") tag or a transponder carried by the user;
    based at least in part on the monitoring, in response to movements of the user, following, by the UAV, the user; and
    recording, with the camera, a video image related to activity of the user.

2. The method of claim 1, further comprising receiving a command to record at least a portion of the video image in slow motion.

3. The method of claim 1, wherein activating the UAV comprises receiving a voice command from the user.

4. The method of claim 3, wherein receiving the voice command comprises receiving a voice command comprising one of (i) hover, (ii) record or (iii) follow me.

5. The method of claim 1, wherein activating the UAV comprises receiving a signal from a device separate from the UAV.

6. The method of claim 5, wherein the device comprises one of (i) a computer, (ii) a key fob or (iii) a phone.

7. The method of claim 1, further comprising activating a microphone on the UAV, wherein recording a video image related to activity of the user comprises recording, with the microphone, sound corresponding to at least a portion of the video image.

8. An unmanned aerial vehicle (UAV) comprising:
    a processor to execute one or more instructions;
    a command interpreter to receive commands from a user;
    a propulsion system;
    a location module to monitor, directly by the UAV, a position of the UAV with respect to the user and provide navigation to the UAV to follow movements of the user while the propulsion system moves the UAV, wherein the position of the UAV with respect to the user is monitored directly by the UAV via at last one of processing at least one of signals received from a camera on the UAV, signals received from a microphone on the UAV, signals received from a proximity sensor on the UAV, location information received from a radio-frequency identification ("RFID") tag or a transponder carried by the user; and
    the camera to record a video image related to activity of the user while the UAV follows movements of the user.

9. The UAV of claim 8 further comprising an output module to create an output of the video image.

10. The UAV of claim 8, wherein the command interpreter is configured to interpret a command to record at least a portion of the video image in slow motion.

11. The UAV of claim 8, wherein the command interpreter is configured to interpret a voice command comprising one of (i) hover, (ii) record or (iii) follow me.

12. The UAV of claim 8, wherein the command interpreter is configured to interpret a command received as a signal from a device separate from the UAV.

13. The UAV of claim 12, wherein the device comprises one of (i) a computer, (ii) a key fob or (iii) a phone.

14. The UAV of claim 1, further comprising a microphone to record sound corresponding to at least a portion of the video image.

15. An apparatus, comprising:
    one or more processors; and
    at least one computer-readable storage medium having computer-executable instructions stored thereupon which, when executed by the one or more processors, cause the apparatus to
        activate an unmanned aerial vehicle (UAV) such that the UAV begins flying,
        activate a camera on the UAV,
        monitor, directly by the UAV, a position of the UAV with respect to a user, wherein the position of the UAV with respect to the user is monitored directly by the UAV via at last one of processing at least one of signals received from a camera on the UAV, signals received from a microphone on the UAV, signals received from a proximity sensor on the UAV, location information received from a radio-frequency identification ("RFID") tag or a transponder carried by the user, based at least in part on the monitoring, in response to movements of the user, follow the user, and record, with the camera, a video image related to activity of the user.

16. The apparatus of claim 15, wherein the computer-executable instructions, when executed by the one or more processors, further cause the apparatus to receive a command to record at least a portion of the video image in slow motion.

17. The apparatus of claim 1, wherein activating the UAV comprises receiving a voice command from the user.

18. The method of claim 17, wherein receiving the voice command comprises receiving a voice command comprising one of (i) hover, (ii) record or (iii) follow me.

19. The apparatus of claim 15, wherein activating the UAV comprises receiving a signal from a device separate from the UAV, wherein the device comprises one of (i) a computer, (ii) a key fob or (iii) a phone.

20. The apparatus of claim 15, wherein the computer-executable instructions, when executed by the one or more processors, further cause the apparatus to activate a microphone on the UAV, wherein recording a video image related to activity of the user comprises recording, with the microphone, sound corresponding to at least a portion of the video image.

* * * * *